United States Patent
Stevens

(10) Patent No.: US 7,886,105 B2
(45) Date of Patent: Feb. 8, 2011

(54) COMBINED FIBRE CHANNEL AND SAS HOST BUS ADAPTER

(75) Inventor: Leslie M. Stevens, Webster, MA (US)

(73) Assignee: LSI Corporation, Milpitas, CA (US)

( * ) Notice: Subject to any disclaimer, the term of this patent is extended or adjusted under 35 U.S.C. 154(b) by 46 days.

(21) Appl. No.: 12/327,970

(22) Filed: Dec. 4, 2008

(65) Prior Publication Data

US 2010/0146185 A1 Jun. 10, 2010

(51) Int. Cl.
*G06F 13/20* (2006.01)
(52) U.S. Cl. ...................... 710/313; 709/230
(58) Field of Classification Search ......... 710/306–307, 710/313, 315, 316; 370/466–467; 709/230, 709/232–234, 236
See application file for complete search history.

(56) References Cited

U.S. PATENT DOCUMENTS

| | | | |
|---|---|---|---|
| 7,155,546 | B2 | 12/2006 | Seto |
| 2006/0095589 | A1* | 5/2006 | Seto .......................... 709/246 |
| 2008/0276033 | A1* | 11/2008 | DeCenzo et al. ............ 710/316 |

* cited by examiner

*Primary Examiner*—Clifford H Knoll
(74) *Attorney, Agent, or Firm*—Duft Bornsen & Fishman, LLP

(57) ABSTRACT

Apparatus, systems, and methods for coupling Fiber Channel (FC) storage devices and serial attached SCSI (SAS) storage device to a computer system through a single host bus adapter (HBA). The HBA includes a SAS storage controller four coupling to one or more SAS storage devices and an FC interface for coupling to one or more FC storage devices. The HBA also includes translation logic to translate information exchanged between the SAS storage controller and the FC storage device(s). Translation may include translation of addressing information between FC protocols and formats used by the SAS storage controller, may include use of a buffer to enable exchanges at different data rates, and may include use of a buffer to aggregate an inbound FC multiframe sequence into a single data buffer for use by the SAS storage controller.

12 Claims, 4 Drawing Sheets

COMBINED FIBRE CHANNEL AND SAS HOST BUS ADAPTER

BACKGROUND

1. Field of the Invention

The invention relates generally to host bus adapter (HBA) for coupling a host computer system to peripheral devices and more specifically relates to an HBA that couples both Fibre Channel (FC) and Serial Attached SCSI (SAS) storage device to a host computer system.

2. Discussion of Related Art

Fibre Channel has been a common standard for coupling of storage devices to a computer system for high speed applications. SAS has been evolving as a lower cost alternative to Fibre Channel providing similar performance at lower costs. Further, using a SAS connection, still lower cost Serial Advanced Technology Attachment (SATA) storage devices may be used by utilizing the SATA Tunneling Protocol (STP) in the SAS family of protocols.

Some computing environments are migrating new storage applications to lower cost SAS/SATA architectures but still must support older, legacy storage applications operating on FC storage devices coupled through an FC communication medium. In such cases, a computing system must provide two HBAs—one for coupling to the SAS/SATA storage devices and another for coupling to the FC connected storage devices. Use of two HBAs consumes resources in the computing system and complicates software applications that may require access to both the SAS/SATA storage devices and the FC storage devices.

Thus it is an ongoing challenge to simplify structures to support both FC and SAS/SATA storage devices on a single computing system.

SUMMARY

The present invention solves the above and other problems, thereby advancing the state of the useful arts, by providing a single HBA that seamlessly supports both FC and SAS/SATA storage devices. The combined FC/SAS/SATA HBA is adapted to support multiple SAS/SATA devices coupled to a redundant array of independent drives (RAID) controller circuit on the HBA and also supports externally coupled FC storage devices coupled to the same RAID controller on the HBA. The FC storage devices are coupled to the RAID controller in a manner that translates the FC data exchanges into a SAS style of operation. The computing system may operate both types of storage devices through a single software (e.g., device driver) programming interface. The computing system thus conserves resources by using only a single bus interface slot and requiring only a single software (driver) interface to the HBA RAID controller. Further, by translating the FC exchanges in operation of the HBA's RAID controller into SAS-like exchanges, all storage devices coupled through the combined HBA may be managed transparently regardless of the protocol and media used to couple them (FC or SAS).

In one aspect hereof, an HBA is provided for use in a computing system. The HBA includes a SAS storage controller circuit adapted to couple the HBA to a first storage device and a Fibre Channel (FC) interface circuit adapted to couple the HBA to a second storage device. The HBA further includes a SAS/FC translation circuit coupled to the SAS storage controller circuit and coupled to the FC interface circuit. The translation circuit is adapted to intercept exchanges between the storage controller interface and the FC interface circuit and is further adapted to translate the intercepted exchanges between SAS protocols and FC protocols. The HBA enables an attached computer system to access either or both of the first storage device and the second storage device as a SAS compatible storage device.

Another aspect hereof provides a method operable in an HBA, the HBA including a Fibre Channel (FC) interface and including a serial attached SCSI (SAS) storage controller. The method includes exchanging information between the SAS storage controller and a first storage device coupled to the HBA using a SAS protocol and exchanging information between the SAS storage controller and a second storage device through the FC interface. The method also includes translating the information exchanged between the SAS storage controller and the second storage device between FC protocols and a format used by the SAS storage controller.

DETAILED DESCRIPTION OF THE DRAWINGS

Figure 1:
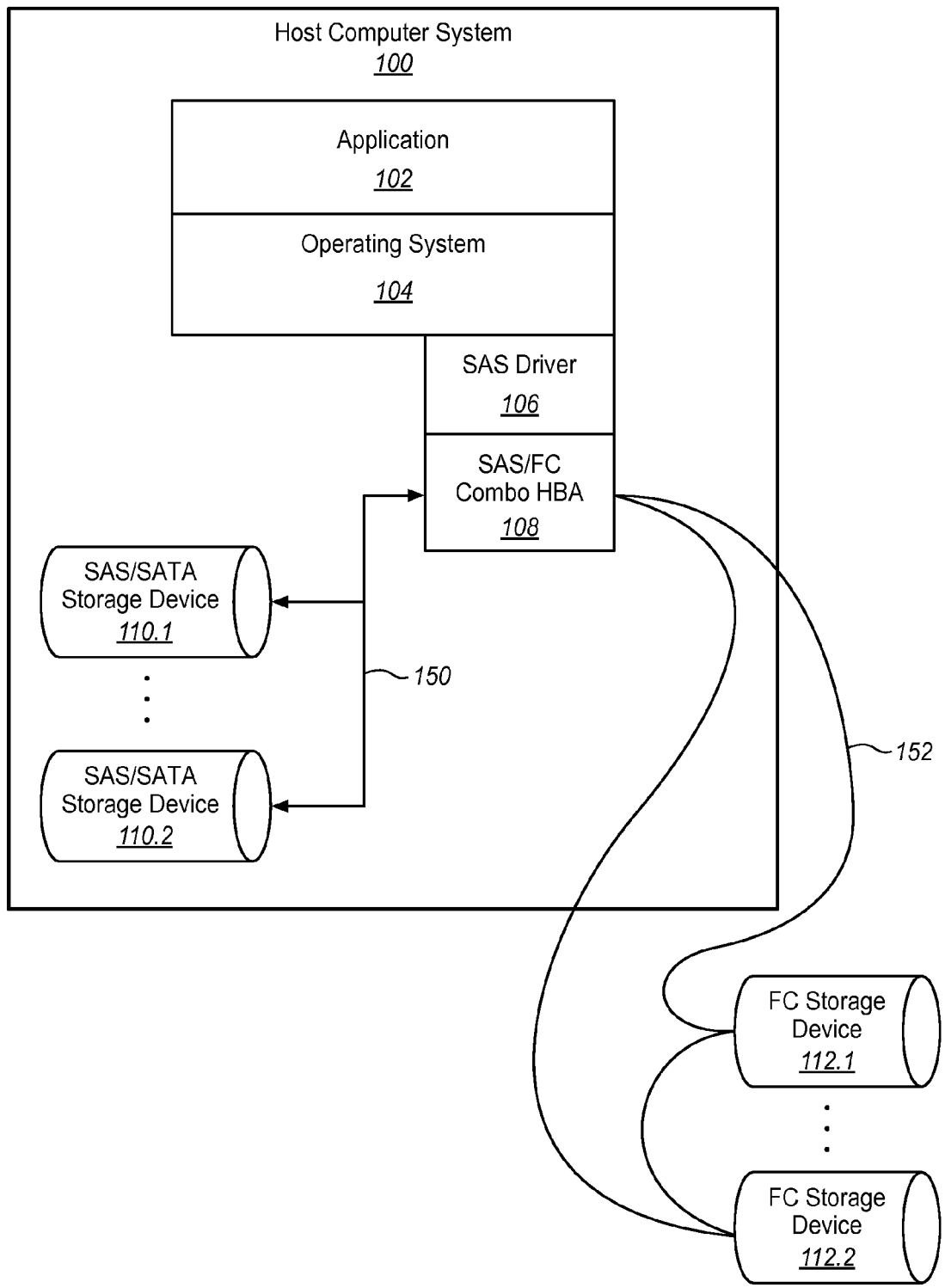
FIG. 1 is a block diagram of an exemplary computer system including a combination HBA in accordance with features and aspects hereof.

FIG. 1 is a block diagram of a host computer system 100 that includes a combination HBA 108 capable of coupling the host system, through a single HBA, to both SAS/SATA storage devices 110.1 through 110.2 and to Fibre Channel storage devices 112.1 and 112.2. The combined SAS/FC HBA 108 may couple to the SAS/SATA storage devices 110.1 and 110.2 by standard SAS communication media and protocols 150. In addition, the SAS/FC combination HBA 108 may coupled to FC storage devices 112.1 and 112.2 utilizing standard Fibre Channel arbitrated loop (FCAL) media and protocols 152 (or other Fibre Channel compliant media and protocols).

The combination HBA 108 permits the host computer system to utilize a single SAS device driver 106 for coupling operating system 104 and application 102 to any of the storage devices (SAS/SATA/FC). By contrast to prior techniques, multiple HBAs would be required, a first for SAS/SATA storage device interaction and a second for FC storage device interaction. In addition to multiple HBAs, prior techniques would require multiple device driver modules to couple the operating system 104 and application 102 to the various storage devices. Still further, higher level storage management features within operating system 104 would be required to interact through multiple such device drivers, each coupled to a corresponding type of HBA, to permit access to the variety of storage devices (thus further complicating the storage applications that may desire access to a logical grouping or volume of storage devices that may include both SAS/SATA devices and Fibre Channel devices).

As shown in the exemplary embodiment of FIG. 1, the SAS/SATA storage devices 110.1 and 110.2 may be physically internal to the host computer system 100 and coupled to HBA 108 through standard SAS internal wiring and communication media 150. Fibre Channel storage devices 112.1 through 112.2 may be coupled via an external connector of HBA 108 to external storage devices physically present outside of host computer system 100 using standard FCAL communication media 152. Those of ordinary skill in the art will further recognize that any combination of internally configured storage devices and externally configured storage devices may be utilized with features and aspect hereof. Thus the particular configuration showing SAS/SATA devices internal to host computer system 100 and Fibre Channel storage devices physically external to host computer system 100 is intended merely as exemplary of one embodiment of features and aspects hereof. Still further, those of ordinary skill in the art will readily recognize that any number of the storage devices may be configured in the computer system 100 limited principally by physical connector space and logical addressing capabilities of the HBA 108.

It will be recognized that combination HBA 108 advantageously conserves resources in computer system 100 by utilizing only a single host system bus connector for coupling of SAS/SATA/FC storage devices. Further, system 100 utilizing HBA 108 advantageously reduces software resources within computer system 100 by utilizing a single device driver 106 for interacting with SAS/SATA/FC storage devices.

Figure 2:
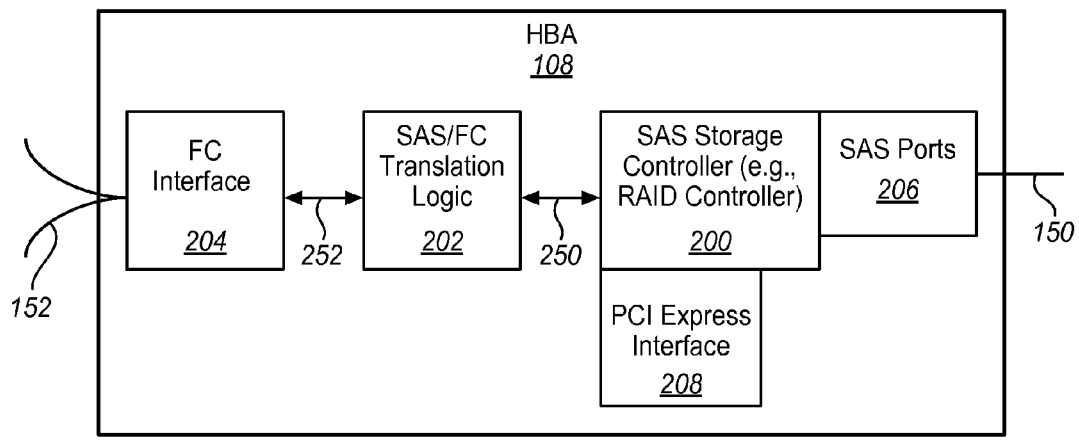
FIG. 2 is a block diagram providing exemplary additional details of the combination HBA of FIG. 1 in accordance with features and aspects hereof.

FIG. 2 is a block diagram providing exemplary additional details of an embodiment of HBA 108 of FIG. 1. HBA 108 may include SAS storage controller 200. SAS storage controller 200 may be, for example, a RAID controller chip adapted for interaction with SAS/SATA storage devices to provide high performance, high reliability RAID storage management features. SAS ports 206 represent ports integrated with or coupled to SAS storage controller 204 for coupling one or more SAS/SATA storage devices via internal cabling 150 (or via external cabling and mounting). PCI Express interface 208 may be similarly integrated within SAS storage controller 200 or may be coupled with storage controller 200 for purposes of coupling HBA 108 to a PCI Express host system bus of the host computer system utilizing HBA 108. Those of ordinary skill in the art will readily recognize that any of a variety of well-known host bus interface components may be utilized for coupling HBA 108 to a host computer system interface bus. PCI Express is merely shown as one common example of a commercially available host computer system bus.

SAS storage controller 200 is coupled with SAS/FC translation logic 202 via path 250 which is, in turn, coupled with FC interface 204 via path 252. FC interface 204 may be, for example, a Tachyon interface circuit as generally known and commercially available that provides FC protocol FC1 and FC2 layer logic for coupling with FC storage devices via FC communication media and protocol 152. The Tachyon chip is one exemplary component useful for such an FC interface 204. Numerous other commercially available FC interface components may also be utilized as FC interface 204 within HBA 108 as a matter of design choice. Storage controller 200 may be any suitable controller circuit including, for example, a SAS RAID storage controller circuit such as is commercially available from LSI Corporation (see, e.g., www.lsi.com). Paths 250 and 252 coupling translation logic to the SAS storage controller 200 and the FC interface 204, respectively, may be any suitable bus architecture for coupling signals of each device to the translation logic 202. In particular, translation logic 202 may include suitable bus interface logic for coupling to each of the potentially unique bus structures on paths 250 and 252.

SAS/FC translation logic 202 provides translation of information to be exchanged between SAS storage controller 200 and FC interface 204. For example, addressing information associated with FC storage devices coupled through FC interface 204 may be translated from or into corresponding SAS addressing information such that each FC storage device may be associated with a corresponding SAS address in operation of SAS storage controller 200. Further, FC frames sequences representing an FC multiframe sequence transmission in FC communications may be assembled and aggregated in a buffer within SAS/FC translation logic 202. Still further, SAS/FC translation logic 202 may utilize a buffer to provide speed matching capabilities to permit full speed operation on either side of the translation logic 202 despite a potential difference in data rates in the design of the FC communications and that of the SAS storage controller 200 in interacting with SAS storage devices through SAS ports 206. SAS/FC translation logic 202 therefore provides all necessary translation of information to be exchanged such that SAS storage controller 200 may interact with Fibre Channel storage devices as though they are other SAS storage devices. By providing such translation, a host computer system device driver component, adapted for interaction with SAS/SATA storage devices through SAS storage controller 200, may also interact with Fibre Channel storage devices in essentially the same manner that it interacts with SAS/SATA storage devices coupled to the HBA.

Figure 3:
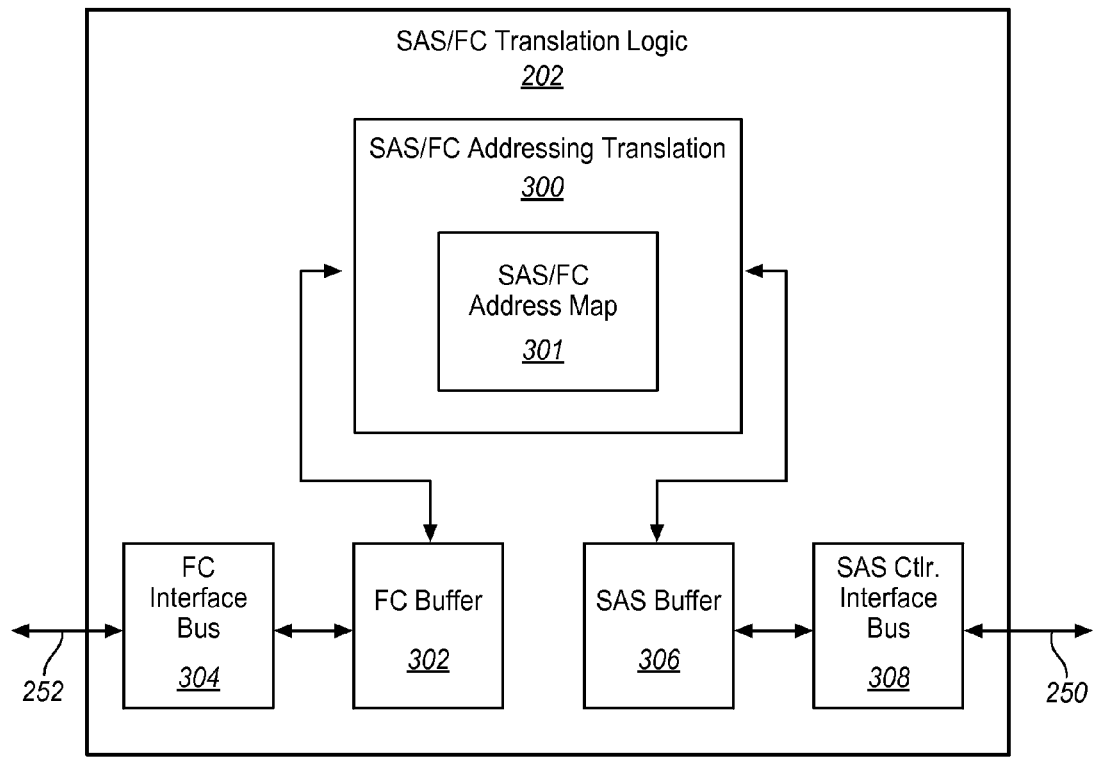
FIG. 3 is a block diagram providing exemplary additional details of the SAS/FC translation logic of the exemplary HBA of FIG. 2 in accordance with features and aspects hereof.

FIG. 3 is a block diagram providing exemplary additional details of the structure of FC translation logic 202 of FIG. 2. Translation logic 202 may include SAS/FC addressing translation logic 300 for translating between FC protocol addressing standards and SAS protocol addressing standards in exchanges between the SAS storage controller 200 and Fibre Channel interface 204 of FIG. 2. Addressing translation 300 may use, for example, a SAS/FC address map table 301 to map between FC addresses and SAS addresses for each FC storage device accessed by the SAS storage controller. Specific logic for mapping between FC and SAS addresses for a particular FC storage device will be readily apparent to those of ordinary skill in the art as a matter of design choice. Further, those of ordinary skill in the art will readily recognize numerous well known techniques to initially load the map table 301 with the addresses to be mapped in exchanges between the SAS storage controller and the FC storage devices.

Translation logic 202 may also include a SAS buffer 306 for receiving and transmitting SAS frames or other SAS information between the translation logic 202 and the SAS storage controller coupled via path 250. SAS controller interface bus logic 308 adapts signals within the translation logic 202 for exchange with the signals used by the SAS storage controller coupled via path 250. The SAS buffer 306 may provide speed matching capabilities to allow for different operating speeds (based on data rates of the SAS storage controller relative to the FC storage devices). In addition, SAS buffer 306 may be used to assemble and disassemble SAS frames and other information exchanged between translation logic 202 and the SAS storage controller.

Still further translation logic 202 may include FC buffer 302 for receiving and transmitting FC frames or other FC information between the translation logic 202 and the FC storage devices coupled via path 252. FC interface bus logic 304 adapts signals within the translation logic 202 for exchange with the signals used by the FC interface coupled via path 252. The FC buffer 302 may provide speed matching capabilities to allow for different operating speeds (based on data rates of the SAS storage controller relative to the FC storage devices). In addition, FC buffer 302 may be used to assemble and disassemble FC frames and other information exchanged between translation logic 202 and the FC storage devices. In particular, FC buffer 302 may serve as a multiframe sequence buffer used to receive and aggregate multiple FC frames that are received as a multiframe sequence into a single buffer for transfer to the SAS storage controller.

Those of ordinary skill in the art will recognize that SAS buffer 306 and FC buffer 302 may be physically implemented as a single memory logically divided into portions for each purpose in the translation logic 202 or may be implemented as distinct memory subsystems as a matter of design choice.

Figure 4:
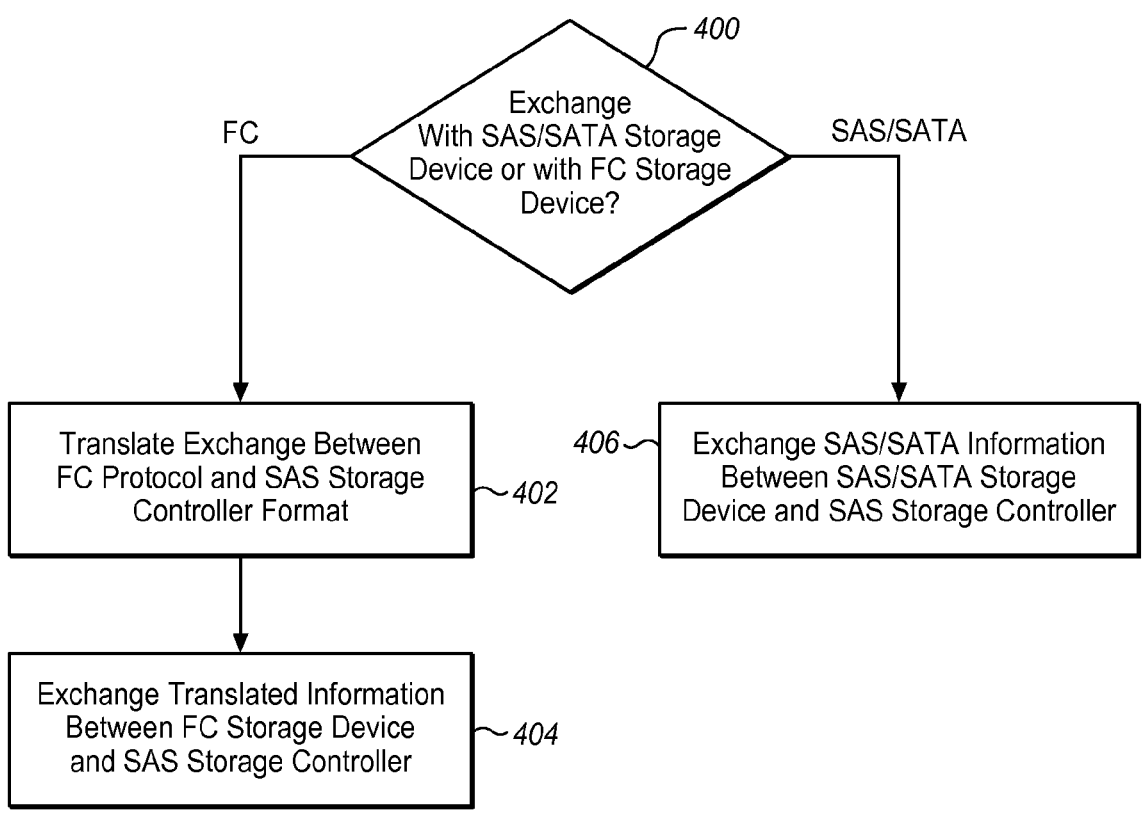
FIG. 4 is a flowchart describing an exemplary method for an HBA to exchange information with either or both of an FC storage device and a SAS/SATA storage device in accordance with features and aspects hereof.

FIG. 4 is a flowchart describing an exemplary method in accordance with features and aspects hereof operable within a combined SAS/SATA/FC HBA. Step 400 determines whether a desired exchange is directed between a SAS/SATA storage device and the SAS storage controller or is directed between an FC storage device and the SAS storage controller. If the latter, step 402 translates appropriate information for exchange between the FC storage device and the SAS storage controller. As noted above, such translation may include translation of addressing information between that used by the FC protocols and the appropriate addressing information format for the SAS storage controller. In addition, the translation may include aggregation of FC frames representing an FC multiframe sequence into a single buffer for transmission to the SAS storage controller. Still further, translation may include use of a buffer for speed matching to assure independence of the operating speed of the FC protocol and media in communicating with an FC storage device and the standard data rates associated with the SAS storage controller.

If step 400 determines that the desired exchange is between a SAS/SATA storage device and the SAS controller, step 406 performs the normal exchange operations between the SAS storage controller and the SAS/SATA storage device. Such normal SAS/SATA information exchanges are well known to those of ordinary skill in the art and therefore need not be further detailed here.

Figure 5:
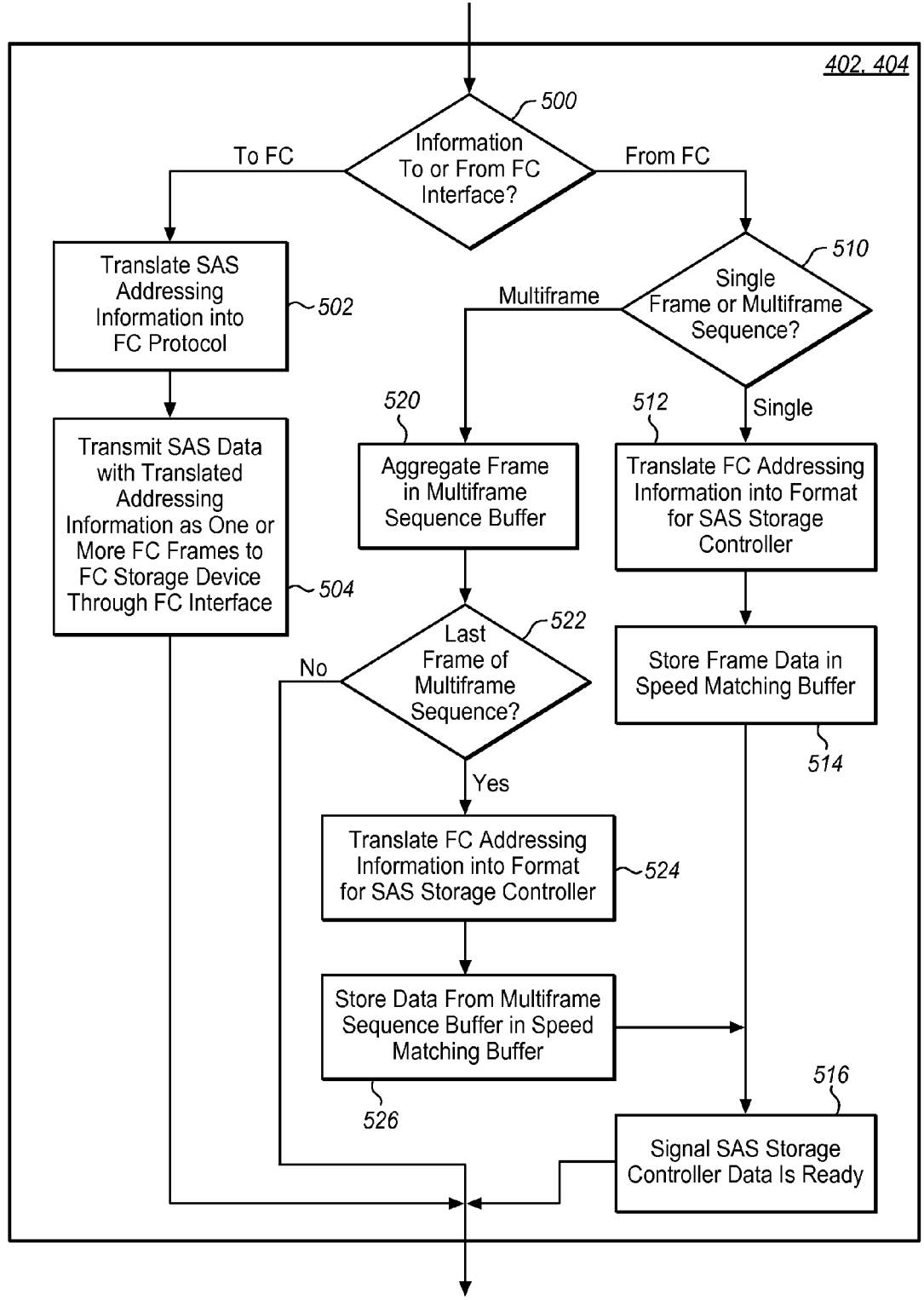
FIG. 5 is a flowchart describing exemplary additional details of the method of FIG. 4.

FIG. 5 is a flowchart providing exemplary additional details of the operation of steps 402 and 404 of FIG. 4 to exchange information between an FC storage device and the SAS storage controller of the HBA. Step 500 first determines whether the exchange is directed from the SAS controller to the FC storage device or from the FC storage device to the SAS storage controller. In the case of an exchange directed from the SAS storage controller to the FC storage device, step 502 translates the SAS addressing information into corresponding addressing information for use in the FC frames to be sent to the FC storage device. As noted above, the address translation may include both translation of the particular format used for FC addressing as compared to SAS protocol addressing as well as translation of a logical address used by the SAS storage controller into a corresponding physical address of the FC storage device. Thus, the SAS storage controller may address each FC storage device as though it is another SAS/SATA storage device and appropriate translation will be performed by step 502 within the translation logic. The frame/frames as translated to use FC addressing may be stored in a buffer for transfer to the FC storage device at appropriate data rates for the FC device. Step 504 then transmits the SAS data with associated translated addressing information as one or more FC frames directed to the FC storage device through the FC interface of the HBA.

Where step 500 determines that the transmission is directed from the FC storage device to the SAS storage controller of the HBA, step 510 first determines whether the received FC frame represents a portion of a multiframe sequence or represents a single FC frame. If the FC transmission represents a single FC frame, step 512 translates the FC addressing information from the single FC frame into the corresponding appropriate format for the SAS storage controller. Step 514 then stores the received FC frame data in a buffer for transmission to the SAS storage controller. Step 516 then signals the SAS storage controller that data is ready to be retrieved from the buffer. The SAS storage controller may then retrieve the data sent from the FC storage device in a manner consistent with its retrieval of data from SAS storage devices.

If step 510 determines that a received FC frame is part of a multiframe sequence, step 520 aggregates the received frame in a buffer to form a single buffer of data for transmission to the SAS storage controller. Step 522 then determines whether this FC frame represents the last frame of the multiframe sequence. If not, processing completes awaiting receipt of the last such frame. If the received FC frame is the last frame of the multiframe sequence, step 524 translates the FC addressing information associated with the FC multiple frames into appropriate format for use by the SAS storage controller. Step 526 then stores the data in the buffer for transmission to the SAS storage controller. Step 516 then signals the SAS storage controller, as described above, that data is ready to be retrieved in the buffer.

Those of ordinary skill in the art will readily recognize numerous additional and equivalent steps that may be performed in the methods of FIGS. 4 and 5. Such additional and equivalent steps are omitted herein for simplicity and brevity of this discussion. Thus methods of FIGS. 4 and 5 are intended merely as representative of exemplary embodiments of methods in accordance with features and aspects hereof operable within a combined HBA capable of communicating with both SAS/SATA storage devices and with FC storage devices. Still further, the methods described in FIGS. 4 and 5 may be implemented as custom electronic circuits such as in an ASIC or field programmable gate array (FPGA) and/or may be implemented as suitably programmed instructions operable in an appropriate general or special purpose processor.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A host bus adapter (HBA) for use within a computing system, the HBA comprising:
   a serial attached SCSI (SAS) storage controller circuit adapted to couple the HBA to a first storage device;
   a Fibre Channel (FC) interface circuit adapted to couple the HBA to a second storage device; and
   a SAS/FC translation circuit coupled to the SAS storage controller circuit and coupled to the FC interface circuit, the translation circuit adapted to intercept exchanges between the SAS storage controller circuit and the FC interface circuit, the translation circuit further adapted to translate the intercepted exchanges between SAS protocols and FC protocols, wherein the HBA enables an attached computer system to access either or both of the first storage device and the second storage device as a SAS compatible storage device, and wherein the HBA couples to a host system bus of an attached computer system.

2. The HBA of claim 1 wherein the first storage device is a SAS storage device and the second storage device is an FC storage device.

3. The HBA of claim 1 wherein the first storage device is a serial advanced technology attachment (SATA) storage device and the second storage device is an FC storage device.

4. The HBA of claim 1 wherein the SAS storage controller circuit includes:

a redundant array of independent drives (RAID) controller, and wherein the RAID controller is adapted to enable an attached host computer system to access a RAID logical volume comprising portions the first storage device and/or portions of the second storage device.

5. The HBA of claim 1 wherein the SAS/FC translation circuit includes:

address translation logic to translate between FC addressing information used by the FC interface circuit in accessing the second storage device and SAS addressing information used by the SAS storage controller circuit.

6. The HBA of claim 1 wherein the SAS/FC translation circuit includes:

a buffer adapted to receive FC inbound frames from the second storage device wherein the buffer is used to aggregate inbound data contained in multiple received FC inbound frames received through the FC interface circuit to provide a single buffer of inbound data to the SAS storage controller circuit.

7. The HBA of claim 1 wherein the SAS/FC translation circuit includes:

a buffer adapted to receive FC inbound frames from the second storage device, wherein the FC interface circuit is adapted to receive inbound FC frames at a data rate higher than the data rate of the SAS storage controller circuit, and wherein the SAS storage controller circuit is adapted to receive inbound data from the FC inbound frames through the buffer.

8. A method operable in a host bus adapter (HBA) within a computing system, the HBA including a Fibre Channel (FC) interface and including a serial attached SCSI (SAS) storage controller, the method comprising:

exchanging information between the SAS storage controller and a first storage device coupled to the HBA using a SAS protocol;

exchanging information between the SAS storage controller and a second storage device through the FC interface;

translating, within the HBA, the information exchanged between the SAS storage controller and the second storage device between FC protocols and a format used by the SAS storage controller; and communicating with an attached computing system using a host system bus of the computing system.

9. The method of claim 8 wherein the step of translating further comprises:

translating address information between FC protocol and the format used by the SAS storage controller.

10. The method of claim 8 wherein the step of translating further comprises:

translating between FC addressing information used by the FC interface circuit in accessing the second storage device and SAS addressing information used by the SAS storage controller.

11. The method of claim 8 wherein the step of translating further comprises:

storing inbound FC multiframe sequences in a buffer adapted to receive FC inbound frames from the second storage device to aggregate inbound data contained in multiple received FC inbound frames to provide a single buffer of inbound data to the SAS storage controller.

12. The method of claim 8 wherein the step of translating further comprises:

storing inbound FC frames from the second storage device in a buffer, wherein the FC inbound frames are received at a data rate higher than the data rate of the SAS storage controller, and wherein the SAS storage controller is adapted to receive inbound data from the FC inbound frames through the buffer.

* * * * *